(12) United States Patent
Reiman et al.

(10) Patent No.: US 10,247,618 B2
(45) Date of Patent: Apr. 2, 2019

(54) ACTIVE GROUNDED THERMOCOUPLE AND METHOD OF OPERATION

(71) Applicant: Watlow Electric Manufacturing Company, St. Louis, MO (US)

(72) Inventors: Jeffrey Reiman, Dover, MN (US); John P. Rohde, Winona, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 389 days.

(21) Appl. No.: 15/143,929

(22) Filed: May 2, 2016

(65) Prior Publication Data

US 2016/0320249 A1 Nov. 3, 2016

Related U.S. Application Data

(60) Provisional application No. 62/155,559, filed on May 1, 2015.

(51) Int. Cl.
| | |
|---|---|
| *G01K 7/00* | (2006.01) |
| *G01K 1/00* | (2006.01) |
| *G01K 7/02* | (2006.01) |
| *G01K 1/08* | (2006.01) |
| *F01N 3/20* | (2006.01) |
| *F01N 13/00* | (2010.01) |
| *F01N 3/027* | (2006.01) |
| *G01K 7/04* | (2006.01) |
| *G01K 7/06* | (2006.01) |

(Continued)

(52) U.S. Cl.
CPC ............... *G01K 7/02* (2013.01); *F01N 3/027* (2013.01); *F01N 3/08* (2013.01); *F01N 3/2013* (2013.01); *F01N 13/008* (2013.01); *G01K 1/08* (2013.01); *G01K 7/021* (2013.01); *G01K 7/04* (2013.01); *G01K 7/06* (2013.01); *F01N 2560/06* (2013.01); *F23J 15/08* (2013.01); *G01K 2205/04* (2013.01); *G01K 2219/00* (2013.01); *Y02T 10/26* (2013.01)

(58) Field of Classification Search
USPC .................................. 374/179, 208, 166, 110
See application file for complete search history.

(56) References Cited

U.S. PATENT DOCUMENTS 3,942,242 A * 3/1976 Rizzolo .................... G01K 7/04
136/227
4,460,802 A * 7/1984 Benedict .................. G01K 7/06
136/230

(Continued)

FOREIGN PATENT DOCUMENTS

GB 1472733 5/1977

OTHER PUBLICATIONS

Candela, G.; "Isolated Loop Powered Thermocouple Transmitter", TI Designs, Oct. 14, 2014; pp. 1-93.
ISRWO of PCT/US2016/030386 dated Jul. 5, 2016.

*Primary Examiner* — Mirellys Jagan
(74) *Attorney, Agent, or Firm* — Burris Law, PLLC

(57) ABSTRACT

An active temperature measurement system includes at least one grounded thermocouple and a processor in communication with the at least one grounded thermocouple. The processor is configured to receive measurements from the at least one grounded thermocouple. The at least one grounded thermocouple is biased by an isolated voltage when the processor is receiving a measurement from the at least one grounded thermocouple.

20 Claims, 11 Drawing Sheets

(51) Int. Cl.
*F01N 3/08* (2006.01)
*F23J 15/08* (2006.01)

(56) References Cited

U.S. PATENT DOCUMENTS

| | | | | |
|---|---|---|---|---|
| 5,765,949 A * | 6/1998 | Haddad | ............... | G01K 7/021 |
| | | | | 374/179 |
| 7,004,626 B1 * | 2/2006 | Giberson | ............... | G01K 7/02 |
| | | | | 136/230 |
| 2008/0232428 A1 * | 9/2008 | Ripley | ............... | G01K 1/08 |
| | | | | 374/208 |

* cited by examiner

ACTIVE GROUNDED THERMOCOUPLE AND METHOD OF OPERATION

CROSS-REFERENCE TO RELATED APPLICATIONS

This application claims the benefit of U.S. provisional patent application Ser. No. 62/155,559 filed on May 1, 2015, the entire contents of which are incorporated herein by reference in their entirety.

FIELD

This disclosure relates generally to temperature measurement systems. More specifically, this disclosure relates to temperature measurement systems utilizing one or more grounded thermocouples

BACKGROUND

The statements in this section merely provide background information related to the present disclosure and may not constitute prior art.

A thermocouple is a sensor used to measure temperature. Thermocouples generally include two wires made from dissimilar materials. The wires are welded together at one end, creating a junction. When a junction experiences a change in temperature, a voltage is created. This voltage, in turn, can then be interpreted to calculate the temperature at the junction point.

There are generally three types of thermocouples used when measuring temperature—exposed thermocouples, grounded thermocouples, and ungrounded thermocouples. An exposed thermocouple has junction outside the probe wall or sheath and is therefore directly exposed to the target medium. These types of thermocouples have excellent heat transfer and quick response times but are limited by the type of target media when they can be used. Generally, these thermocouples are not suitable for caustic or corrosive environments.

For ungrounded thermocouples, the sensing junction of this type of thermocouple is physically located within a sheath, but is electrically isolated from the sheath. This results in a slow response time, but has the advantage in that the electrical isolation provided by not being connected to the sheath gives these thermocouples more accurate measurements due to reduced noise. These thermocouples can also be used in caustic or corrosive environments and are more robust, as the sheath provides protection from the environment.

Grounded thermocouples also utilize a sheath but have the junction in direct electrical contact with the sheath. These thermocouples have a faster response time than ungrounded thermocouples and can be used in caustic or corrosive environments. However, these thermocouples are generally susceptible to electrical noise, such as ground loops, which impacts accuracy, especially when measuring small variations in temperature.

SUMMARY

The present disclosure provides a temperature measurement system that includes at least one grounded thermocouple and a processor in communication with the at least one grounded thermocouple. The processor is configured to receive measurements from the at least one grounded thermocouple. The at least one grounded thermocouple is biased by an isolated voltage when the processor is receiving a measurement from the at least one grounded thermocouple.

In another form, a plurality of thermocouples is provided. In this form, only one of the plurality of grounded thermocouples is biased with the isolated voltage when the processor is receiving a measurement from the one grounded thermocouple. The other thermocouples are unbiased and disconnected from the isolated voltage.

In still another form, the temperature measurement system may include a multiplexer. The multiplexer is configured to provide measurements taken from one of the plurality of thermocouples to the processor. In addition, the multiplexer may be further configured to bias at least one grounded thermocouple with the isolated voltage when the processor is receiving a measurement from the at least one grounded thermocouple.

In another form, the temperature measurement system may include an analog-to-digital converter in communication with the processor and the at least one grounded thermocouple. The analog-to-digital converter is configured to convert measurements from the at least one grounded thermocouple to digital numbers and provide the digital numbers to the processor.

In still another form, the at least one grounded thermocouple may utilized a single signal wire. In this form, the at least one grounded thermocouple includes a sheath having an open end and a closed distal end having a tip. The tip of the closed distal end defines a junction. The signal wire extends from the open end to the junction point. The signal wire and the sheath are made from dissimilar metals configured to produce an electric potential related to the temperature at the junction point across the signal wire and the sheath.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
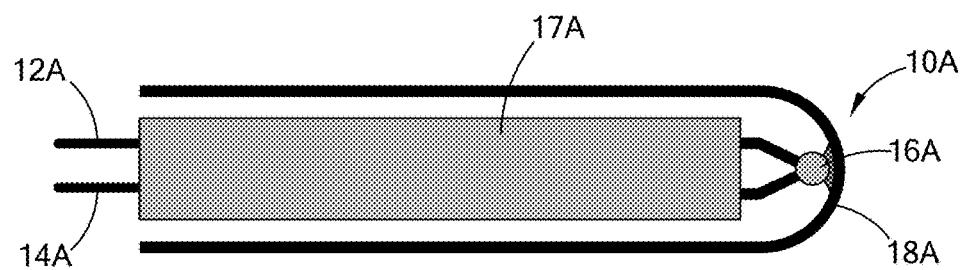
FIG. 1A is a schematic representation of a grounded thermocouple utilizing two wires.

The following description is merely exemplary in nature and is in no way intended to limit the present disclosure or its application or uses. It should be understood that throughout the description, corresponding reference numerals indicate like or corresponding parts and features.

The present disclosure generally relates to a temperature measurement system and a method of use associated therewith. The temperature measurement system made and used according to the teachings contained herein is described throughout the present disclosure in in numerous applications. One of these applications includes diesel exhaust systems. This is just but one application of the temperature measurement system and the incorporation and use of temperature measurement system in conjunction with other types of thermal management applications is contemplated to be within the scope of the disclosure.

The following specific forms are given to illustrate the design and use of temperature measurement systems according to the teachings of the present disclosure and should not be construed to limit the scope of the disclosure. Those skilled-in-the-art, in light of the present disclosure, will appreciate that many changes can be made in the specific forms which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Referring to FIG. 1A, a grounded thermocouple 10A is shown. Here, the grounded thermocouple 10A includes a first wire 12A and a second wire 14A. The first wire 12A and second wire 14A are connected to one another at a junction 16A. Generally, the first wire 12A and the second wire 14A are made of dissimilar metals. These dissimilar metals may include a wide range of materials, such as iron, nickel, copper, chromium, aluminum, platinum, rhodium and their alloys. Of course, it should be understood that any type of material suitable for the construction of thermocouple may be utilized when selecting the dissimilar metals utilized in constructing the first wire 12A and the second wire 14A.

The grounded thermocouple 10A may also include an insulator 17A. The insulator 17A surrounds and protects portions of the first wire 12A and the second wire 14A. The insulator 17A may be useful if the thermocouple 10A is utilized in high moisture and pressure in corrosive environments. The insulator 17A may be made of magnesium oxide; however, any other suitable material may also be utilized. Encapsulating the insulator 17A, the first wire 12A and the second wire 14A is a sheath 18A. The sheath 18A provides protection to the insulator 17A as well as the first wire 12A and the second wire 14A.

When a temperature measurement is taken at the junction 16A, the dissimilar metals of the first wire 12A and the second wire 14A will produce a voltage difference that is related to temperature. Using a reference table that contains a representative voltage that relates to specific temperature, one can determine the temperature at the junction 16A.

Figure 1B:
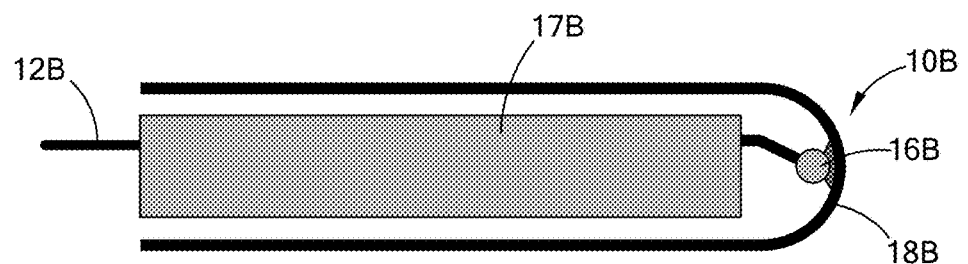
FIG. 1B is a schematic representation of a grounded thermocouple utilizing a single wire.

Referring to FIG. 1B, another version of the thermocouple 10B is shown. It should be understood that like reference numerals have been utilized to refer to like elements. As such, any description previously given is equally applicable. Here, the thermocouple 10B utilizes a single wire configuration. More specifically, there is a single wire 12B in connection with the junction 16B. As stated previously, in order for a thermocouple to work properly, there must be two dissimilar materials utilized so as to create a voltage difference representative of the temperature. In this form, the dissimilar material utilized is found in the sheath 18B. Essentially, as the wire 12B is connected to the sheath 18B at the junction 16B, a voltage difference can be measured between the wire 12B and the sheath 18B. As such, unlike the configuration shown in FIG. 1A, this configuration allows for a single wire to be utilized in reading a voltage representative of temperature.

It should be understood that the foregoing description may utilize either thermocouple or combination thereof. As such, going forward with this description, it should be understood that any mention of the word thermocouple in this description can relate to either the thermocouples described in FIG. 1A or 1B.

Figure 2A:
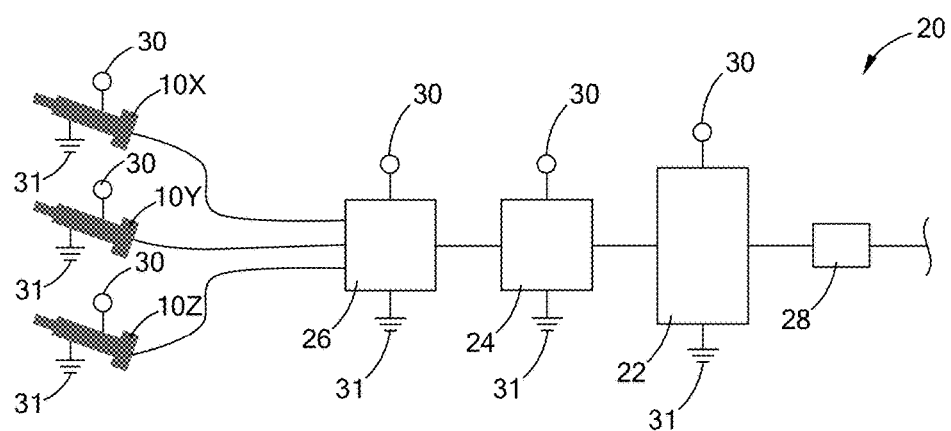
FIG. 2A is a block diagram representation of a temperature measurement system utilizing grounded thermocouples in accordance with the teachings of the present disclosure.

Referring to FIG. 2A, a block diagram of the system 20 for measuring temperature is shown. As its primary components, the system 20 includes a processor 22, an analog-to-digital converter 24, a multiplexer 26, and bus controller 28. The system 20 also includes thermocouples 10X, 10Y, and 10Z. As stated before, the thermocouples 10X, 10Y, and 10Z may be any of the thermocouples previously described in this description. Also, it should be understood that the thermocouples 10X, 10Y, and 10Z may just be one thermocouple or may be numerous thermocouples and should not be limited to three thermocouples as shown. The thermocouples 10X, 10Y, and 10Z may be active thermocouples having integrated electronics.

Here, the thermocouples 10X, 10Y, and 10Z are in communication with the multiplexer 26. The multiplexer 26 functions to multiplex data received from the thermocouples 10X, 10Y, and 10Z. Essentially, the multiplexer 26 will transmit to the analog-to-digital converter 24 information relating to the thermocouples 10X, 10Y, and 10Z, so as to eliminate multiple connections to the analog-to-digital converter 24.

The analog-to-digital converter 24 will then convert data received from the multiplexer 26, which originated with the thermocouples 10X, 10Y, and 10Z to a digital number. This digital number is then provided to the processor 22 for further processing. The processor 22 may communicate with other systems via a bus controller 28. If, for example, the system 20 is utilized in an automobile, the bus controller 28 may be a Controller Area Network (CAN) type bus.

Grounded thermocouples, such as thermocouples 10X, 10Y, and 10Z, have the advantage of rapid response times to temperature changes, but have the disadvantage in that they are susceptible to electrical noise, such as a ground loop. To inhibit such a ground loop with the power supply of the thermocouples 10X, 10Y, and 10Z, isolation is generally provided to the thermocouples 10X, 10Y, and 10Z and then the measurement generated by the thermocouples 10X, 10Y, and 10Z is made.

The system 20 utilizes an isolated voltage 30 for biasing as well as an isolated ground 31. The isolated voltage 30 and the isolated ground 31 are separate from the supply voltage and ground voltage from any other underlying system. For example, if the system 20 is utilized an automobile, the isolated voltage 30 and isolated ground 31 are separate and apart the positive terminal supply voltage of the automobile and the ground provided by the chassis of the automobile.

This isolated voltage 30 biases the thermocouples 10X, 10Y, and 10Z, the processor 22, the analog-to-digital converter 24, and the multiplexer 26. As for grounding, the thermocouples 10X, 10Y, and 10Z, the processor 22, the analog-to-digital converter 24, and the multiplexer 26 are grounded to the isolated ground 31.

However, additional isolation is also provided to the thermocouples 10X, 10Y, and 10Z. In this example, the thermocouples 10X, 10Y, and 10Z will only be biased with the isolated voltage 30 when a desired measurement is taken by one of the thermocouples 10X, 10Y, or 10Z. More specifically, when a measurement is taken from thermocouple 10X, the isolated voltage will bias the thermocouple 10X and not thermocouples 10Y, and 10Z. In like manner, if a measurement is taken of thermocouple 10Y, the isolated voltage will be applied to thermocouple 10Y and removed from thermocouples 10X and 10Z. Similarly, if a measurement is taken of thermocouple 10Z, the isolated voltage will bias thermocouple 10Y and removed from thermocouples 10X and 10Y.

This methodology is taking advantage of the fact that each of the thermocouples 10X, 10Y, and 10Z will likely be attached to the same ground, such as the chassis of an automobile, and will have roughly the same relative voltages. If all of the thermocouples 10X, 10Y, and 10Z were biased at the same time by the isolated voltage 30, the relative voltages could result in noise currents between the thermocouples 10X, 10Y, and 10Z. Because of the very small signal levels being measured from the thermocouples 10X, 10Y, and 10Z, these small variations will cause measurement errors. The advantage to the system 20 is the not having to fully isolating each thermocouple, as only one of the thermocouples 10X, 10Y, or 10Z will be biased.

Figure 2B:
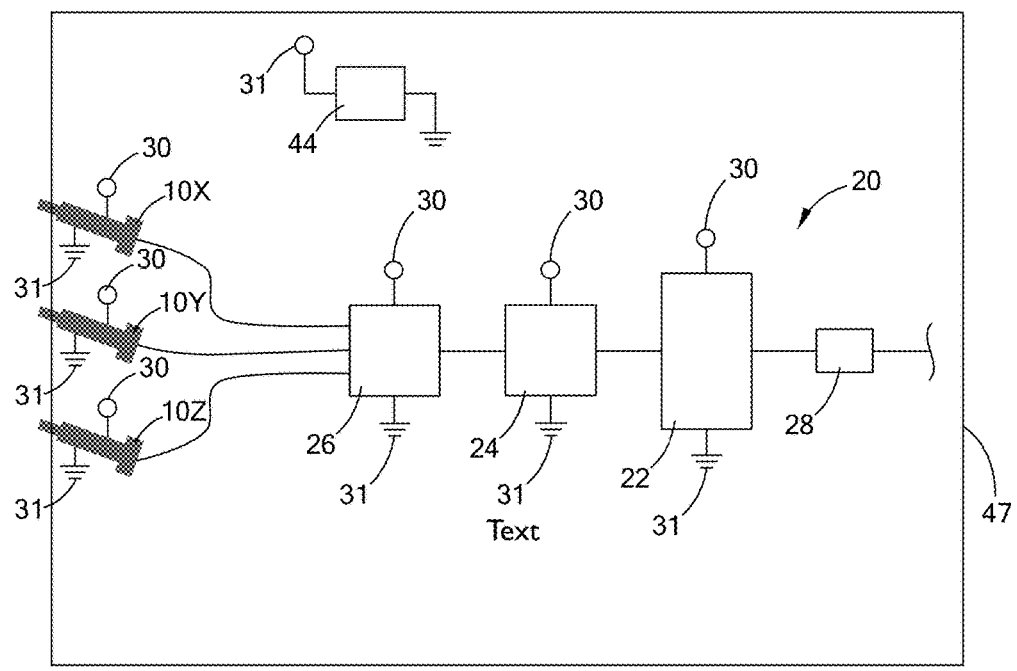
FIG. 2B is a block diagram representation of a temperature measurement system utilizing grounded thermocouples having integrated electronics in accordance with the teachings of the present disclosure.

Referring to FIG. 2B, as stated previously, the thermocouples 10X, 10Y, and/or 10Z may be active thermocouples having integrated electronics. For example, one or more of the thermocouples 10X, 10Y, and/or 10Z may incorporate electronic components. More specifically, one or more of the thermocouples 10X, 10Y, and/or 10Z may include a housing 47 that contains the processor 26, the analog-to-digital converter 24, and/or the multiplexer 22. In addition to these and components, the housing 47 of one or more of the thermocouples 10X, 10Y, and/or 10Z may include the power supply 44 described in the following paragraphs.

Figure 3:
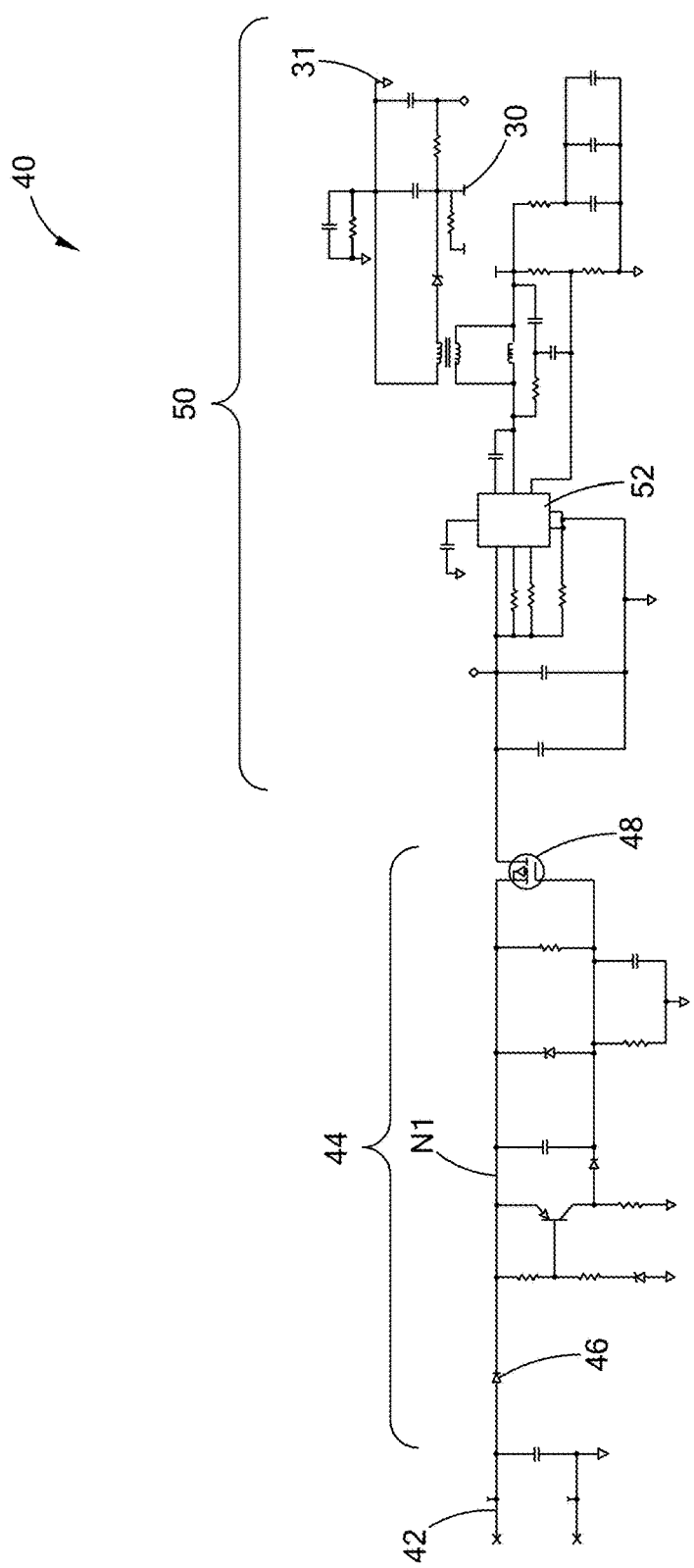
FIG. 3. is an electrical schematic representation of a power supply for the temperature measurement system utilizing grounded thermocouples in accordance with the teachings of the present disclosure.

Referring to FIG. 3, a power supply 40 for the measuring system 20 is shown. The power supply 40 includes a voltage input 42. This voltage input 42 may be connected to the positive voltage terminal of a battery of an automobile. Voltage provided to the voltage input 42 is then provided to overvoltage protection portion 44 of the power supply 40. Overvoltage occurs when the voltage in a circuit is raised above its upper design limit. Depending on its duration, the overvoltage event can be transient—a voltage spike—or permanent, leading to a power surge.

The overvoltage protection portion 44 in one form includes a diode 46 for protecting a source connected to the voltage input 42. In addition, a transistor 48 is connected in series with the diode 46. In addition to these two elements, the overvoltage protection portion 44 includes other electrical elements as shown in FIG. 3 for both signaling and conditioning. When connected as shown, the diode 46, transistor 48, and other components provide overvoltage protection to the power supply portion 46 of the power supply 44.

The power supply portion 46 of the power supply 44 is responsible for generating the isolated voltage and ground provided to the system for measuring temperature 20. The power supply portion 50 includes a regulator 52. The regulator 52 acts as a regulator for regulating an output voltage, such as the isolated voltage provided to the system for measuring temperature. The regulator 52 may be, for example, an LM5019 regulator produced by Texas Instruments, Inc. of Austin, Tex. The regulator 52 has the advantage in that it is capable of producing an isolated voltage without having to provide feedback to a feedback circuit to monitor the isolated voltage to provide the isolated voltage within an expected range. The device 52 is based on a constant on time control scheme using an on time inversely proportional to the input voltage. This control scheme may not require a loop condensation. The current limit is implemented with a forced off time inversely proportional to the output voltage, in this case, the isolated voltage. This scheme provides short circuit protection while providing minimum feedback. The power supply portion 50 outputs an isolated voltage 30, as well as an isolated ground 31. Both the isolated voltage 30 and isolated ground 31 are provided to the system for measuring temperature 20.

Figure 4A:
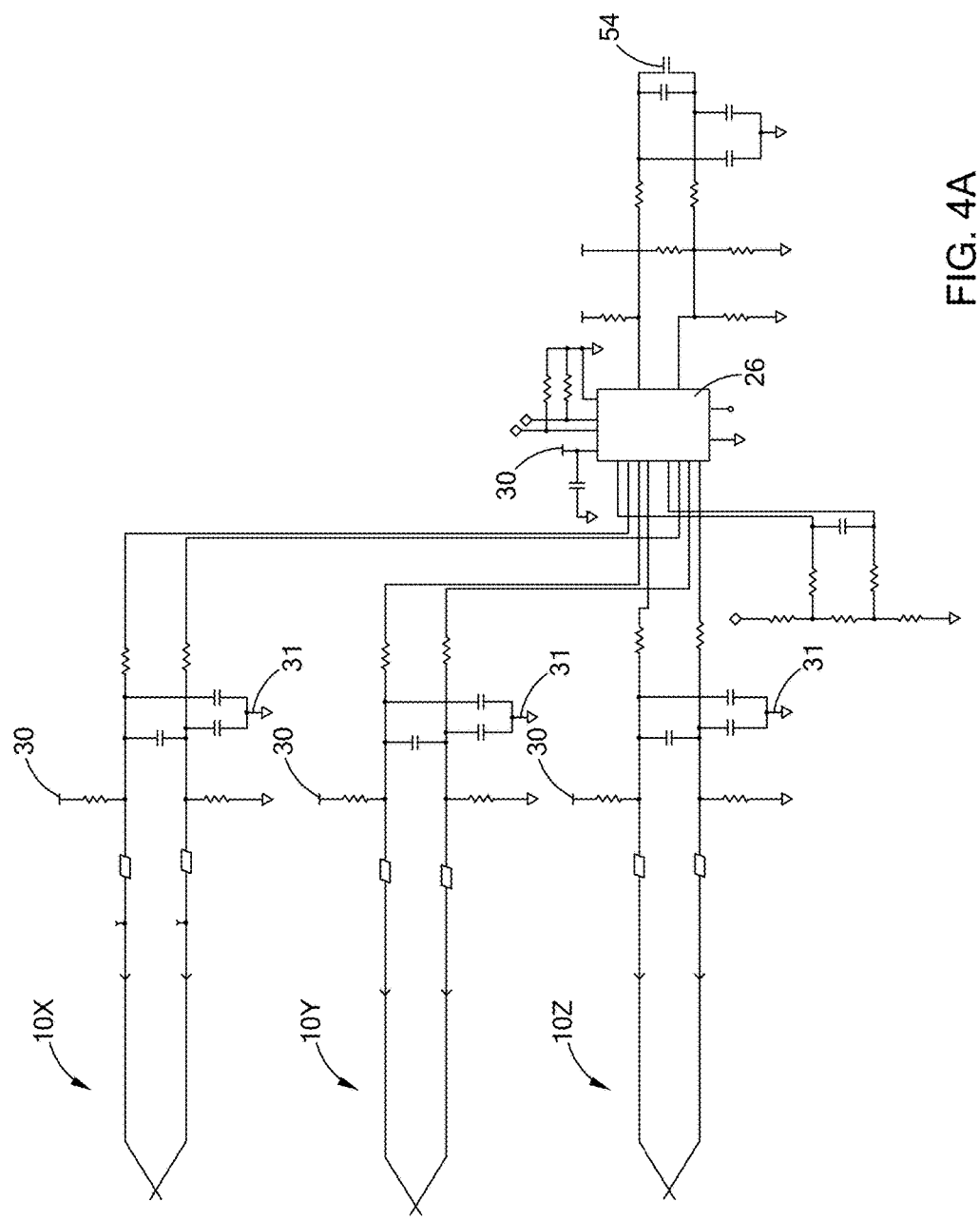
FIGS. 4A and 4B is an electrical schematic representation of the temperature measurement system utilizing grounded thermocouples in accordance with the teachings of the present disclosure.

Referring to FIG. 4A, this figure illustrates a circuit schematic showing thermocouples 10X, 10Y, and 10Z, as well as multiplexer 26. Here, the thermocouples 10X, 10Y, and 10Z are biased by the isolated voltage 30. In addition, the multiplexer 26 is also biased by the isolated voltage 30. As stated before, only one of the multiplexers 10X, 10Y, or 10Z, may be biased by the isolated voltage 30. This bias only occurs to one of the thermocouples 10X, 10Y, and 10Z, when the selected thermocouple is taking a measurement. Application of the isolated voltage 30 to the thermocouples 10X, 10Y, or 10Z can occur through a variety of different methodologies. In this example, the multiplexer 26 has the ability to provide the isolated voltage 30 to only one of the thermocouples 10X, 10Y, and 10Z when a reading is being performed. As stated before, the multiplexer 26, depending on which thermocouple is being utilized, will output to an output line 54 an analog signal representative of the temperature measured by one of the thermocouples 10X, 10Y, or 10Z.

Figure 4B:
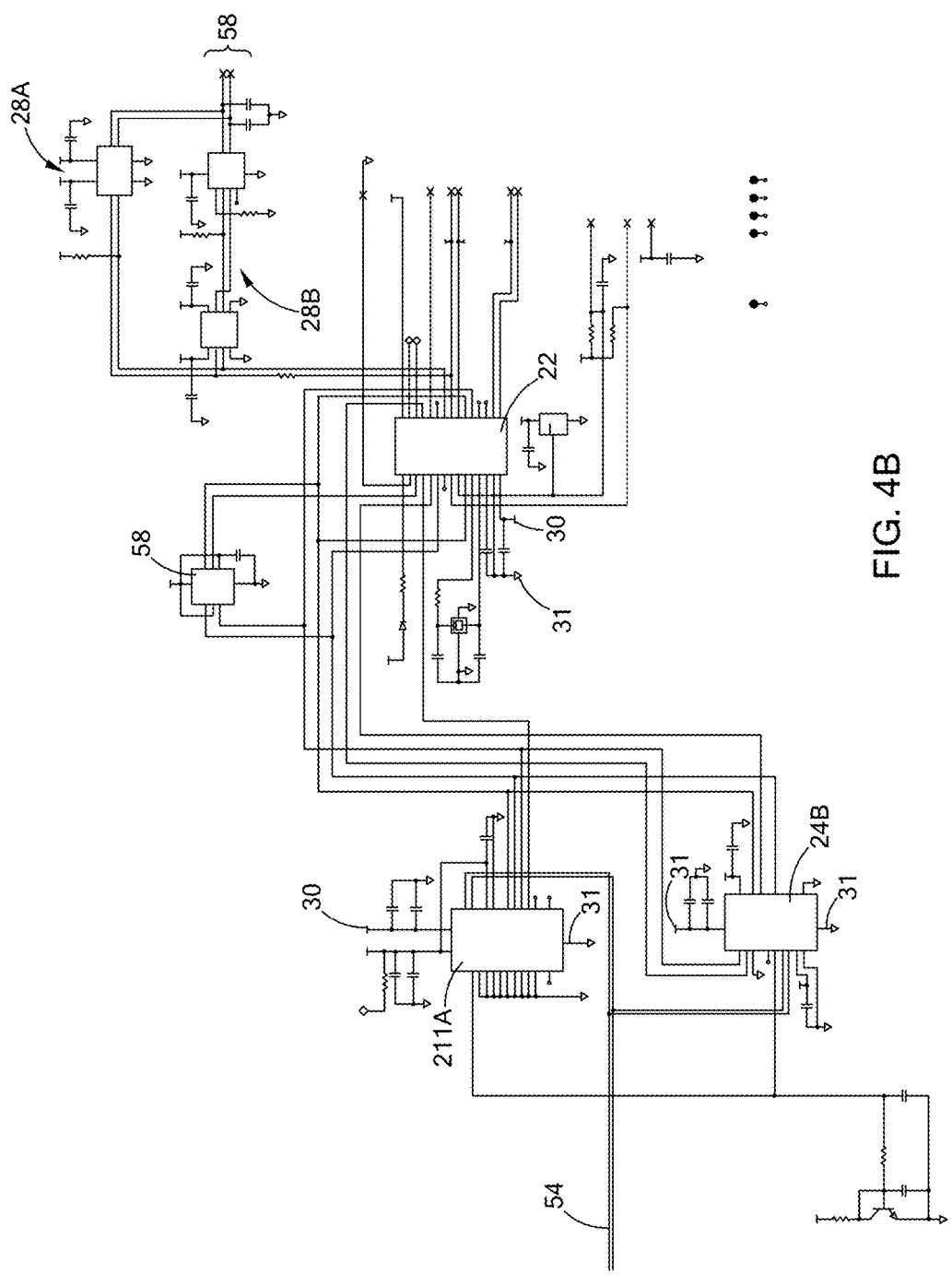

Referring to FIG. 4B, this figure shows schematic circuit representation of the analog-to-digital converter 24, processor 22, and the network controller 28. Here, this example includes two separate analog-to-digital converters 24A and 24B, as well as two separate network controllers 28A and 28B. It should be understood that it is possible that only a single analog-to-digital converter 24A or 24B could be utilized. In like manner, it should be understood that a single network controller 28A or 28B could also be utilized. Similarly, any number of converts and controllers may be used while being within the scope of the present disclosure.

Regardless of the number of analog-to-digital converters utilized, both analog to digital converters 24A and 24B each have the isolated bias voltage 30 applied to them as well as an isolated ground 31. The analog-to-digital converters 24A and 24B receive the analog signal from line 54 from the multiplexer 26 and convert the analog signal to a digital number. This digital number is in turn provided to the processor 22. The processor 22 may store the digital number internally or may also utilize a separate storage device 56, such as an EEPROM.

From there, the processor 22 may provide temperature information to a bus 58. In this example, the bus 58 is a CAN bus. The CAN bus can utilize a single chip network controller, such as controller 28, or may utilize a multichip isolated network controller, such as network controller 28B. Data provided to the bus 58 can be provided to other systems connected to the bus. If the other systems are automobile related, these systems may use temperature information provided by the thermocouples 10X, 10Y, and 10Z other systems, such as a heater for a diesel exhaust system.

As stated previously, the thermocouples 10X, 10Y, and/or 10Z may incorporate electronic components. Like before, one or more of the thermocouples 10X, 10Y, and/or 10Z may incorporate electronic components shown and described in FIGS. 2A and 2B. More specifically, one or more of the thermocouples 10X, 10Y, and/or 10Z may include a housing that contains the processor 26, the analog-to-digital converter(s) 24A and 24B, and/or the multiplexer 22. In addition to these and components, a housing of one or more of the thermocouples 10X, 10Y, and/or 10Z may include the power supply 44 of FIG. 3 and/or the network controllers 28A and/or 28B. Essentially, thermocouples 10X, 10Y, and/or 10Z have a housing that is connected to the sheath of the thermocouples 10X, 10Y, and/or 10Z and contains any combination of the before mentioned electronics. In addition, the housing may have a port or a set of wires that allow the entire thermocouple assembly to be connected to a bus, such as a CAN bus.

As stated previously, the system 20 can be utilized in any one of a number of different applications. One such application are heater systems are used in exhaust systems that are coupled to an internal combustion engine in order to assist in the reduction of the undesirable release of various gases and other pollutant emissions into the atmosphere. These exhaust systems typically include various after-treatment devices, such as diesel particulate filters (DPF); a catalytic converter; selective catalytic reducers (SCR) that capture carbon monoxide (CO), nitrogen oxides ($NO_x$), particulate matters (PMs), and unburned hydrocarbons (HCs) contained in the exhaust gas; a diesel oxidation catalyst (DOC); a lean $NO_x$ trap (LNT); an ammonia slip catalyst; or reformers, among others. The heaters may be activated periodically or at a predetermined time to increase the exhaust temperature and activate the catalysts and/or to burn the particulate matters or unburned hydrocarbons that have been captured in the exhaust system. The activation of these heaters may be determined by a processor that receives temperature information from sensors, such as thermocouples 10X, 10Y, and 10Z and the temperature measurement system 20 described above.

Figure 5:
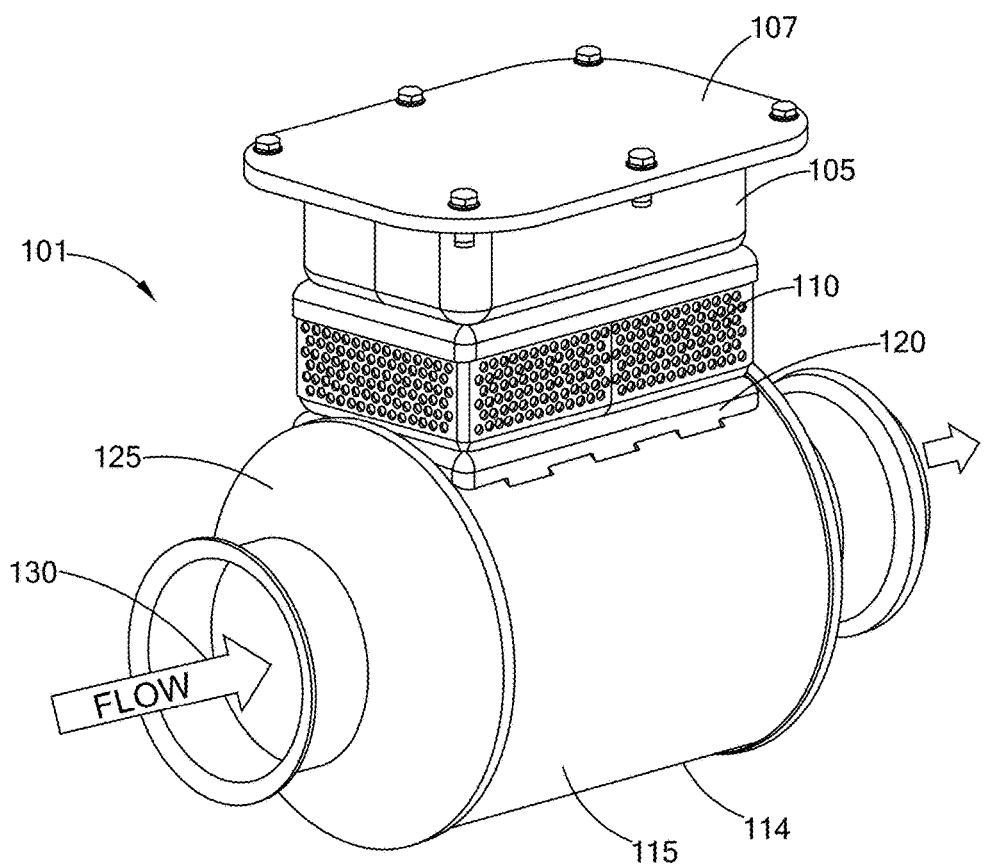
FIG. 5 is a perspective view of a heating apparatus incorporating the temperature measurement system utilizing grounded thermocouples in accordance with the teachings of the present disclosure.

Referring to FIG. 5, one such system in which the teachings of the present disclosure may be applied is a heating apparatus 101, which in one form generally includes a junction box 105, a perforated box assembly 110, a container body 114 including one or more separable container section components 115, and a heater flange component 120. This heating apparatus 101 may be similar to a heating apparatus described in published U.S. Patent Application 2014/0190151, which is commonly owned with the present application hereby incorporated by reference in its entirety. Exhaust system coupling components 125 may be provided at opposing ends of the container body 114 to couple the heating apparatus 101 into an exhaust system (not shown). The exhaust gases flow from the exhaust system into the heating apparatus 101 through a pathway 130 formed in the heating apparatus 101. The pathway 130 is defined jointly by the container body 114 and the heater flange component 120. The heater flange component 120 generally has a plate configuration in one form. The modular design of the heating apparatus 101 allows the dimensions of the various components in the heating apparatus 101 to stay the same with only the length of each component being varied to accommodate the requirement(s) of the application. A junction box lid 107 may be incorporated into the heating apparatus 101. In some applications, such as in a diesel exhaust system, among others, the vibrations arising from the application may be to such a degree that at least one support bracket (not shown) may be necessary to effectively mount the heating apparatus 101.

Figure 6:
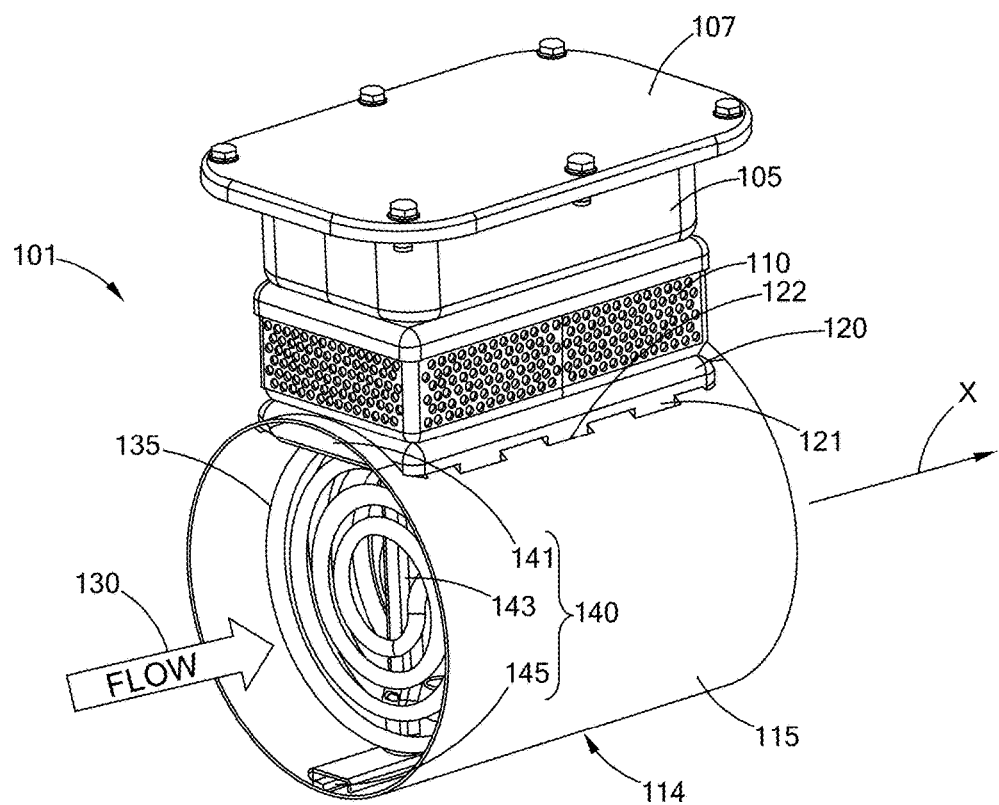
FIG. 6 is another perspective view of the heating apparatus incorporating the temperature measurement system utilizing grounded thermocouples in which the outer exhaust system coupling components have been removed in accordance with the teachings of the present disclosure.
Figure 7:
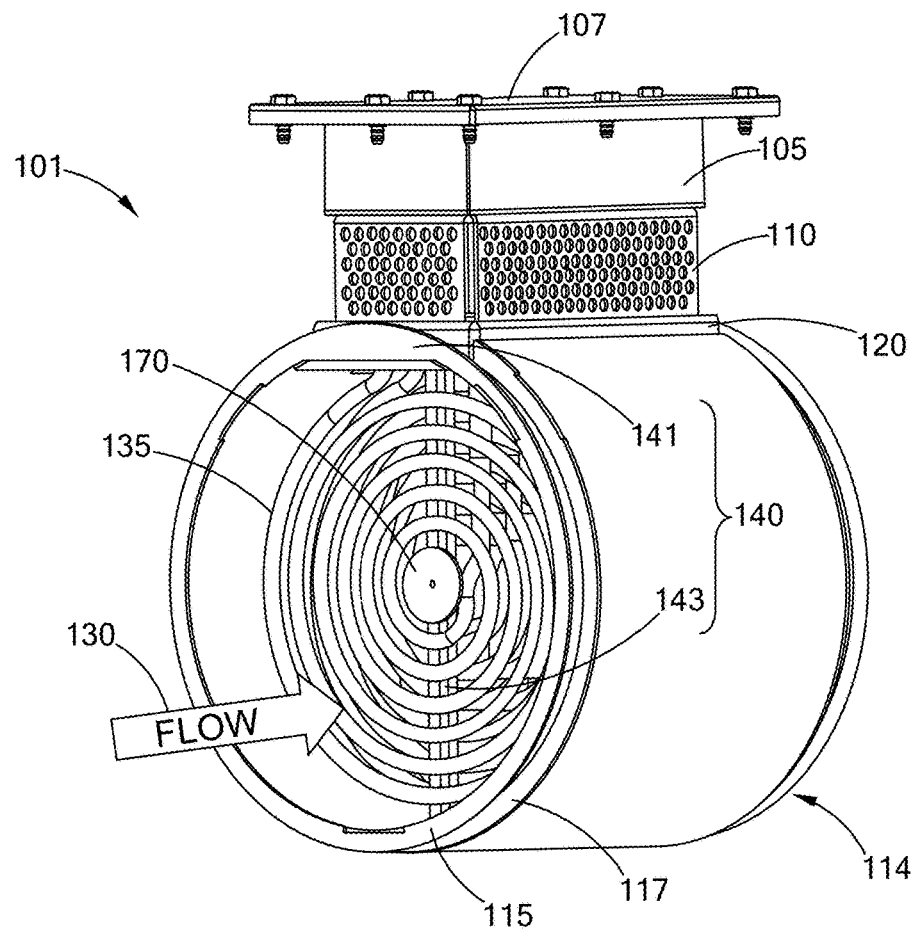
FIG. 7 is another perspective view of the heating apparatus incorporating the temperature measurement system utilizing grounded thermocouples in which the outer exhaust system coupling components have been removed in accordance with the teachings of the present disclosure.

Referring to FIGS. 6 and 7, the heating apparatus 101 further includes one or more heater elements 135 and a bracket assembly 140. In one form, the bracket assembly 140 includes an optional upper spine component 141, one or more element support component 143, and an optional lower spine component 145. In one form, the element support component 143 includes a plurality of posts 143 that are coupled to corresponding ones of the heater elements 135 and are arranged perpendicular to a longitudinal axis X of the container body 114. The posts 143 are coupled to either the container section components 115 of the container body 114 or to the optional upper spine component 141 and lower spine component 145. The posts 143 may be directly coupled to the heater flange component 120 when desirable for applications that do not require the bracket assembly 140 to have an upper spine component. The posts 143 include an optional flow diverter 170 that blocks the flow of exhaust gas down the center of the pathway 130 formed in the heating apparatus 101.

The heater element 135 may exhibit predetermined (e.g., measured) or predictable performance characteristics. One example of such performance characteristics includes the rate of heating for the heater element 35 when it is exposed to a preselected voltage or under a specified process flow condition. The heater element 135 is selected as a cable heater, a tubular heater, a cartridge heater, a flexible heater, a layered heater, a metal foil, or a metal fleece heater. Alternatively, the heater element 135 is a cable heater or tubular heater, or a bare wire heater, among others.

The heater flange component 120 is coupled with the one or more container section components 115 of the container body 114, such that they form an external shroud that surrounds the one or more heater elements 135 and establishes the pathway 130 for the flow of exhaust gas through the heating apparatus 101. The heater flange component 120 and the one or more container section components 115 may contact one another through the use of tabs 121. The tabs 121 may be located on either the heater flange component 120 or the one or more container section components 115. Each tab 121 in one component 115, 120 is mated to a hole 122 located in the other component 120, 115. The use of the tabs 121 facilitates the assembling of the heater flange component 120, the bracket assembly 140, and the heater elements 135 prior to coupling the heater flange component 120 to the container body 114.

Figure 8:
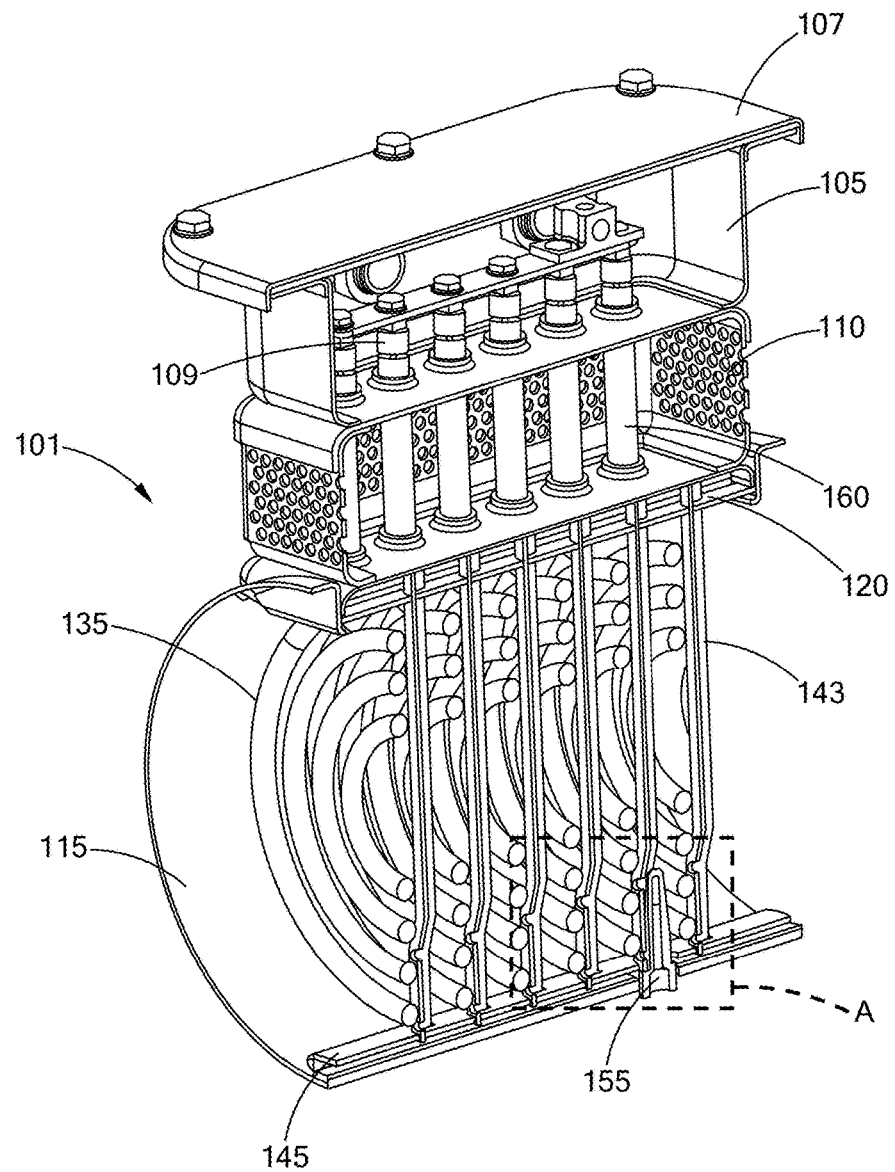
FIG. 8 is a perspective cross-sectional view of the heating apparatus of FIG. 6 in accordance with the teachings of the present disclosure.

Referring now to FIG. 8A, the junction box 105 establishes an electrical connection 109 between the heater elements 135 and a power source (not shown), while the perforated box assembly 110 provides a means to cool the electrical connections 109 and heater elements 135 by creating a longer path for conduction and radiation heat transfer, as well as allow for convective air cooling. The perforated box assembly 110 has at least one wall or skirt that is perforated, thereby, exposing the interior of the perforated box assembly 110 to the atmosphere. The perforated box assembly 110 is used in applications in which the magnitude of heat is such that cooling of the junction box 105 is required. One skilled in the art will understand that the perforations present in the wall or skirt may represent one or more perforations with each perforation being of any size or shape.

The heating apparatus 101 may further include one or more standoff tubes 60 that project from the perforated box assembly 110 through the heater flange component 120 into the external shroud formed by the container section components 115. Each standoff tube 160 encompasses a heater element 135 to provide mechanical support for the heater element 135. One or more of the top and bottom of the optional perforated box, the walls of the perforated box and the standoff tubes may be brazed together using nickel or copper. When desirable, one skilled in the art will understand that it is possible to braze the heater elements 135 directly to the junction box 105 and the optional perforated box 110, thereby, not requiring a standoff tube 160. The brazing can be done by any means known to one skilled in the art, including but not limited to furnace brazing at one time or through a manual brazing process.

The heater flange component 120, the perforated wall or skirt of the perforated box assembly 110, and the standoff tubes 160 may be made from any material suitable for use in an exhaust system; alternatively, they are made from a metal or metal alloy. A metal joining process, such as brazing, among others, may be used to join the heater flange component, perforated skirt of the perforated box assembly, and the standoff tubes. One specific example of a metal joining process includes first tack-welding the components to be joined into position and then performing nickel brazing in a furnace. Such a brazing process provides strength and seals the exhaust, while making all of the joints to the standoff tubes at one time.

The heating apparatus 110 may be a "smart" heating apparatus and may include a combination of at least one heater element 135 and at least one thermocouple 10. Optionally, the heating apparatus 101 may further include a LIN bus, a CAN bus, or other type of bus capable of providing a communication pathway between at least two system components.

A thermocouple 10 may be in contact with the sheath of the heater element 135, located on an element support component (e.g., the post 143) adjacent to the heater element 135, or located upstream or downstream of the heater element 135. The thermocouple 10 may be any the thermocouples described previously in this application, such as those shown and described in FIGS. 1A and 1B. Additionally, more than one thermocouple 10 can be used.

The thermocouple 10 can measure the temperature in a specific or desired location of the heater element 135. The temperature measurement system utilized with the thermocouple 10 may be the temperature measurement system 20 previously described. The measurement of temperature by the thermocouple 10 allows the heating apparatus 1 to reduce power when the heater element 135 is approaching or surpassing a predetermined temperature limit established according to the application being performed. The thermocouple 10 may also be used for diagnostic purposes.

A smart heating apparatus provides the benefits of enhanced diagnostic capability in addition to maximizing heat flux and lowering manufacturing cost. A robust diagnostic capability often depends on the variation exhibited from heater element to heater element. A smart heating apparatus that is capable of using performance characteristics or information for specific heater elements provides for enhanced diagnostic capability by allowing at least a portion of the random variation that arises from manufacturing variances to be corrected or compensated for. The smart heating apparatus may compensate for a thermal gradient present in a diesel oxidation catalyst (DOC), diesel particle filter (DPF), selective catalytic reducer, lean NOx traps, or another exhaust component that includes an after-treatment catalyst. One skilled in the art will understand that other diagnostic activities may also be enabled through the use of smart heating apparatus.

Figure 9A:
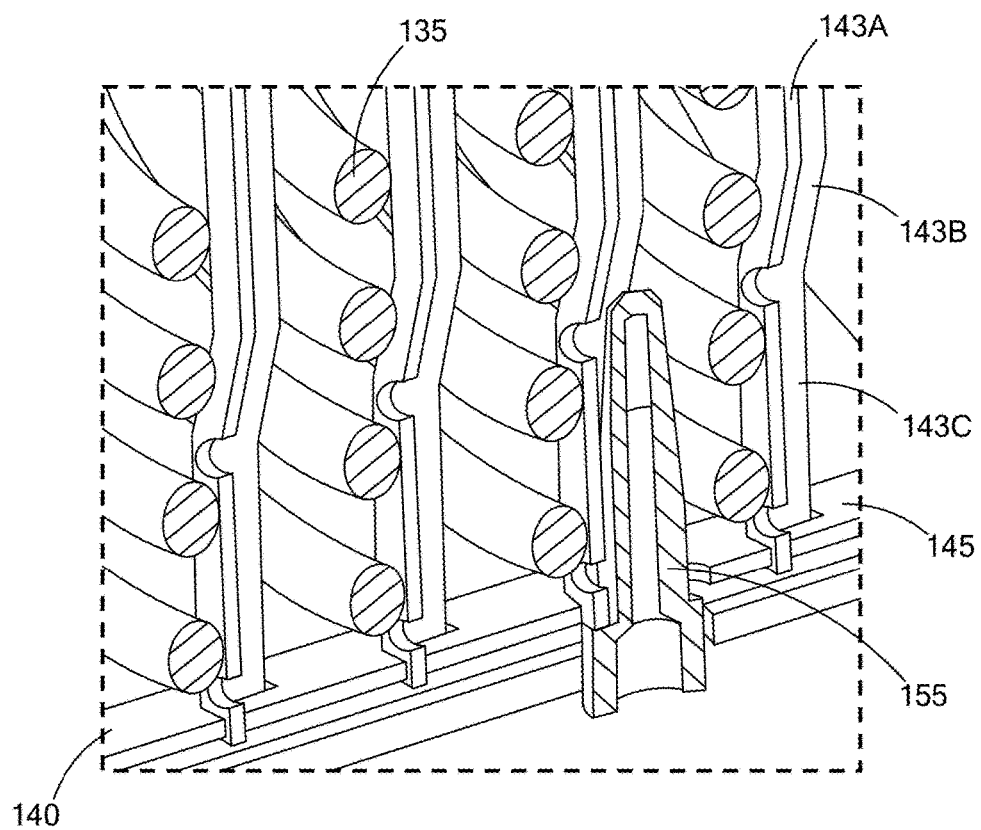
FIG. 9A is an enlarged perspective cross-sectional view of portion A of FIG. 8 in accordance with the teachings of the present disclosure.
Figure 9B:
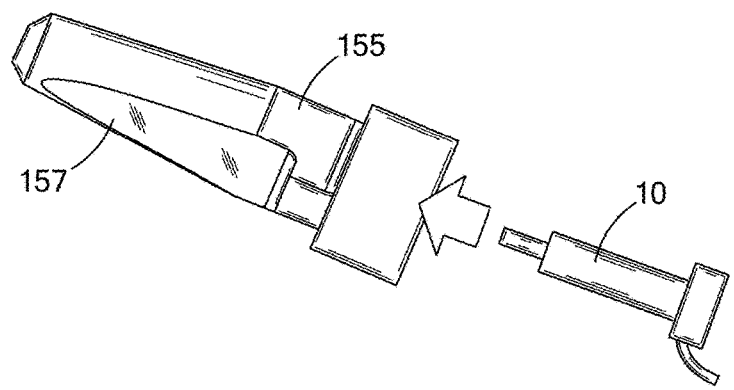
FIG. 9B is a perspective view of a thermowell and an grounded thermocouple with the heating apparatus in accordance with the teachings of the present disclosure.
Figure 2B:
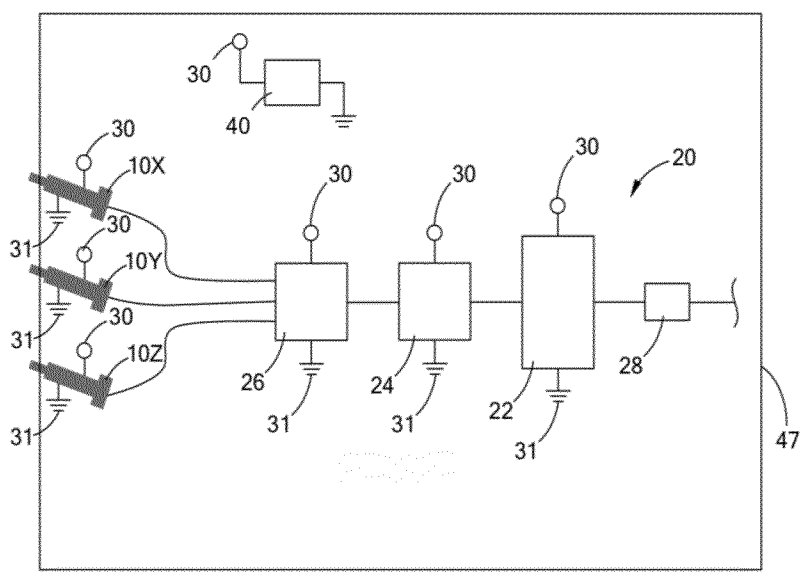
Figure 4B:
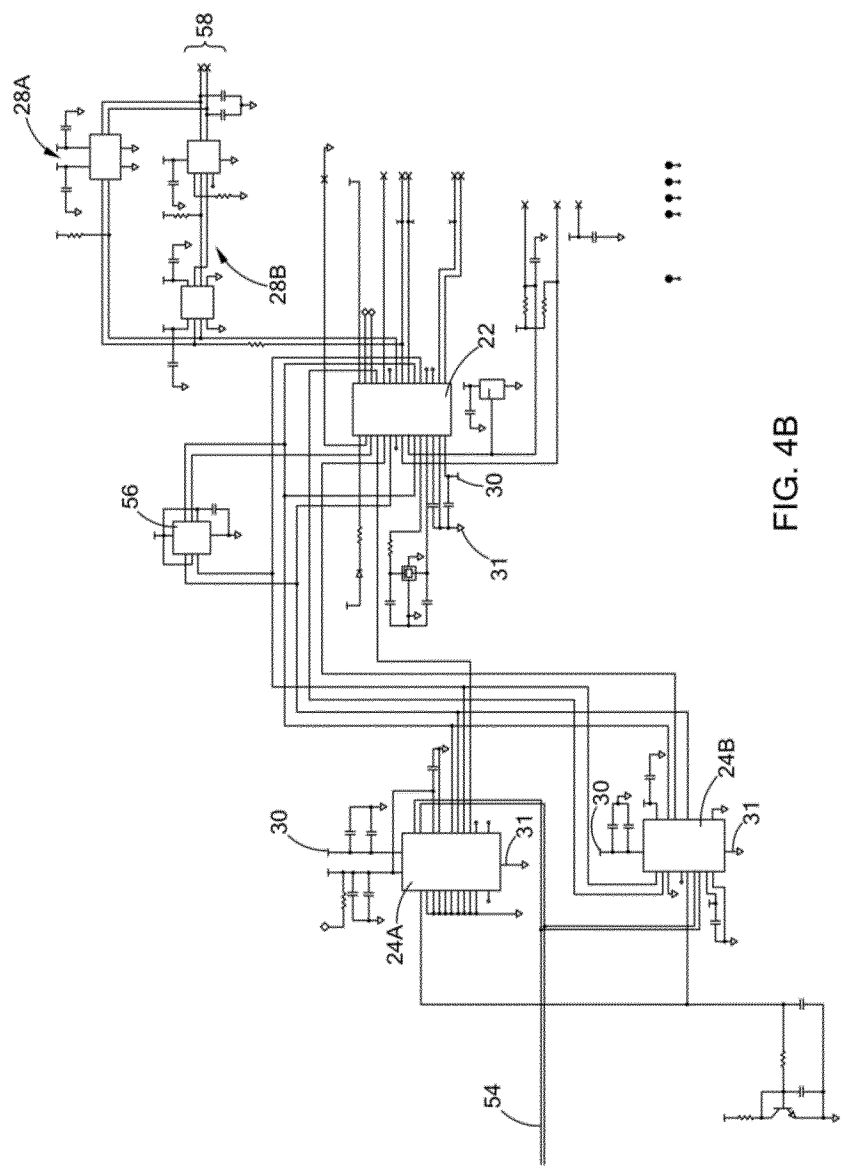

Referring now to FIGS. 9A and 9B, the heating apparatus 101 may further comprise a thermowell 155 integrally attached to the post 143 of the bracket assembly 140, such that the thermowell 155 allows indirect and/or direct contact between the heater element 135 and the thermocouple assembly 156. A thermowell 155 is a tubular fitting used to protect the thermocouple 10 when installed for use in the heating apparatus 101. The thermowell 55 may also be tubular fitting that is open on both ends, thereby, allowing the thermocouple 10 to make direct contact with the flowing exhaust gases, while acting as a seal to prevent the escape of the gases when the thermocouple 10 is inserted into the heating apparatus 101. The thermowell 55 may be placed in contact with any of the posts 143 of the bracket assembly 140. Alternatively, the thermowell 155 may be placed on the second to last heater element 135 in the heating apparatus 101 because it is typically one of the hottest coils and the exhaust gas flows past it immediately prior to exiting the heating apparatus 101. When desirable, the thermocouple 10 does not have to actually contact the heater element 135. In the illustrated design, the heater element 135 actually contacts the post 143 and/or U channel bracket 180, while the thermowell 155 contacts the post 143 and the thermocouple 10 contacts the thermowell 155. One skilled in the art will understand that it is desirable to have a consistent thermal pathway for the life of the product, but not necessarily for the elements to be in direct contact.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A temperature measurement system comprising:
at least one grounded thermocouple operable to measure a temperature;

a processor in communication with the at least one grounded thermocouple, the processor being configured to receive the temperature measured from the at least one grounded thermocouple; and a power supply coupled to the at least one grounded thermocouple and the processor, the power supply configured to receive a voltage input and generate an isolated voltage, wherein the at least one grounded thermocouple is selectively biased with the isolated voltage from the power supply during measurement of the temperature.

2. The system of claim 1, further comprising an analog-to-digital converter in communication with the processor and the at least one grounded thermocouple, the analog-to-digital converter being configured to convert the temperature from the at least one grounded thermocouple to digital values and provide the digital values to the processor.

3. The system of claim 1, wherein the at least one grounded thermocouple comprises:

a sheath having an open end and a closed distal end having a tip, the tip of the closed distal end defining a junction point; and a signal wire extending from the open end to the junction point, wherein the signal wire and the sheath are made from dissimilar metals configured to produce an electric potential across the signal wire and the sheath, and the electric potential is indicative of a temperature at the junction point.

4. The system of claim 1, further comprising a housing coupled to the least one grounded thermocouple, and the power supply is located within the housing.

5. The system of claim 4, wherein the processor is located within the housing.

6. The system of claim 1, wherein the power supply is configured to include an overvoltage circuit operable to control a voltage spike and a regulator operable to regulate the isolated voltage.

7. The system of claim 6, wherein the overvoltage circuit includes a diode and a transistor.

8. The system of claim 1, further comprising a network controller operable to output data to an external communication bus, the network controller in communication with the processor to output data from the processor.

9. The system of claim 8, wherein the processor is configured to output the temperature measured from the at least one grounded thermocouple to the external communication bus via the network controller.

10. The system of claim 1, further comprising:

a plurality of the grounded thermocouples, wherein the plurality of the grounded thermocouples are selectively biased with the isolated voltage one at a time, such that a grounded thermocouple being biased is providing the temperature;

a multiplexer in communication with the plurality of the grounded thermocouples and configured to receive the temperature taken from the grounded thermocouple being biased with the isolated voltage; and an analog-to-digital converter in communication with the multiplexer and the processor, wherein the analog-to-digital converter is configured to convert the temperature received by the multiplexer to digital values and provide the digital values to the processor.

11. The system of claim 10, further comprising a housing coupled to the plurality of the grounded thermocouple, wherein the power supply, the processor, the multiplexer, and the analog-to-digital converter are located within the housing.

12. The system of claim 10, wherein the power supply is electrically coupled to and applies the isolated voltage to the multiplexer and the analog-to-digital converter.

13. The system of claim 1, further comprising a plurality of the grounded thermocouples, wherein the plurality of the grounded thermocouples are selectively biased with the isolated voltage one at a time, such that a grounded thermocouple being biased is providing the temperature to the processor.

14. The system of claim 13, further comprising a multiplexer in communication with the plurality of the grounded thermocouples and the processor, wherein the multiplexer is configured to provide the temperature taken from the grounded thermocouple being biased with the isolated voltage to the processor.

15. The system of claim 14, wherein the multiplexer is configured to bias the grounded thermocouple that provides the temperature with the isolated voltage.

16. A temperature measurement system comprising:

a plurality of grounded thermocouples operable to measure a plurality of temperatures;

a processor in communication with the plurality of grounded thermocouples, the processor being configured to receive a temperature from the plurality of temperatures from a selected grounded thermocouple from among the plurality of grounded thermocouples; and a power supply coupled to the plurality of grounded thermocouples and the processor, the power supply configured to receive a voltage input and generate an isolated voltage, wherein the plurality of grounded thermocouples are selectively biased with the isolated voltage one at a time, such that the selected grounded thermocouple providing the temperature is biased with the isolated voltage.

17. The system of claim 16, wherein each of the plurality of grounded thermocouple comprises:

a sheath having an open end and a closed distal end having a tip, the tip of the closed distal end defining a junction point; and a signal wire extending from the open end to the junction point, wherein the signal wire and the sheath are made from dissimilar metals configured to produce an electric potential across the signal wire and the sheath, and the electric potential is indicative of a temperature at the junction point.

18. The system of claim 16, further comprising:

a multiplexer in communication with the plurality of grounded thermocouples and configured to receive the temperature taken from the selected grounded thermocouple being biased with the isolated voltage; and an analog-to-digital converter in communication with the multiplexer and the processor, wherein the analog-to-digital converter is configured to convert the temperature received by the multiplexer to digital values and provide the digital values to the processor.

19. The system of claim 18 further comprising a housing coupled to the plurality of the grounded thermocouple, wherein the power supply, the processor, the multiplexer, and the analog-to-digital converter are located within the housing.

20. The system of claim 18, wherein the power supply is electrically coupled to and applies the isolated voltage to the multiplexer and the analog-to-digital converter.

* * * * *

UNITED STATES PATENT AND TRADEMARK OFFICE
CERTIFICATE OF CORRECTION

| | |
|---|---|
| PATENT NO. | : 10,247,618 B2 |
| APPLICATION NO. | : 15/143929 |
| DATED | : April 2, 2019 |
| INVENTOR(S) | : Jeffrey Reiman and John P. Rohde |

Page 1 of 4

It is certified that error appears in the above-identified patent and that said Letters Patent is hereby corrected as shown below:

In the Drawings

Please replace Fig. 2B with Fig. 2B as shown on the attached page.

Please replace Fig. 4B with Fig. 4B as shown on the attached page.

In the Specification

In Column 5, Line 61, "power supply 44" should be --power supply 40--.

In Column 6, Line 13, "power supply portion 46" should be --power supply portion 50--.

In Column 6, Lines 13-14, "power supply 44" should be --power supply 40--.

In Column 6, Line 15, "power supply portion 46" should be --power supply portion 50--.

In Column 6, Line 15, "power supply 44" should be --power supply 40--.

In Column 6, Line 57 through Column 7, Line 28 with reference to FIG. 4B; the instance of reference numeral "31" that indicates the isolated voltage connected to analog-to-digital converter 24B is corrected to --30-- as described throughout the specification and at least at Column 7, Lines 1-3; the instance of reference numeral "58" that indicates the storage device is corrected to --56-- as described throughout the specification and at least at Column 7, Lines 8-10.

In Column 7, Lines 30-31, "power supply 44" should be --power supply 40--.

In Column 8, Line 45, "heater element 35" should be --heater element 135--.

In Column 9, Line 18, "standoff tubes 60" should be --standoff tubes 160--.

Signed and Sealed this
Twenty-eighth Day of January, 2020

Andrei Iancu
*Director of the United States Patent and Trademark Office*

In Column 9, Line 46, "heating apparatus 110" should be --heating apparatus 101--.

In Column 9, Line 66, "heating apparatus 1" should be --heating apparatus 101--.

In Column 10, Line 28, "thermowell 55" should be --thermowell 155--.

In Column 10, Line 33, "thermowell 55" should be --thermowell 155--.